United States Patent [19]
Hirai et al.

[11] 3,768,868
[45] Oct. 30, 1973

[54] HYDRAULIC BRAKE SYSTEM
[75] Inventors: Akiyoshi Hirai; Hiroshi Kawaguchi, both of Toyota, Japan
[73] Assignee: Toyota Jidosha Kogyo K.K.
[22] Filed: Oct. 22, 1971
[21] Appl. No.: 191,750

[30] Foreign Application Priority Data
Oct. 23, 1970 Japan.............................. 45/92774

[52] U.S. Cl. .......................... 303/6 C, 60/54.5 HA
[51] Int. Cl............................................ B60t 11/34
[58] Field of Search..................... 303/6 C, 6 R, 10; 60/54.5 HA, 54.6 HA

[56] References Cited
UNITED STATES PATENTS
| | | | |
|---|---|---|---|
| 3,659,420 | 5/1972 | Reinecke | 303/6 C X |
| 3,359,729 | 12/1967 | Guettier | 303/6 C X |
| 3,365,243 | 1/1968 | Doerfler | 303/6 C |
| 3,554,611 | 1/1971 | Kawabe et al. | 303/6 C |
| 3,623,776 | 11/1971 | Wellman | 303/6 C |

Primary Examiner—M. Henson Wood, Jr.
Assistant Examiner—Michael Mar
Attorney—Toren & McGeady

[57] ABSTRACT

A hydraulic brake system including a master cylinder and separate circuits between the master cylinder and the wheel cylinders for the front wheels and for the rear wheels with at least two valves arranged in series in the circuit between the master cylinder and the wheel cylinders for the rear wheels. The pressure regulating valves are proportioning valves each having a valve portion to which the output hydraulic pressure from the valve acts in opposition to the sum of the input hydraulic pressure to the valve and a spring force for producing an output hydraulic pressure having a reduced rate of increase relative to the rate of increase of the input hydraulic pressure after a predetermined level of input hydraulic pressure has been reached. Alternatively, the pressure regulating valves can be provided by a proportioning valve and a limiting valve. The limiting valve has a valve portion to which the sum of its output hydraulic pressure and a spring force is applied in opposition to an input hydraulic pressure for producing a constant output hydraulic pressure after the input hydraulic pressure exceeds a predetermined value.

10 Claims, 7 Drawing Figures

INVENTORS
AKIYOSHI HIRAI
HIROSHI KAWAGUCHI

BY Toren and McHeady

ATTORNEYS

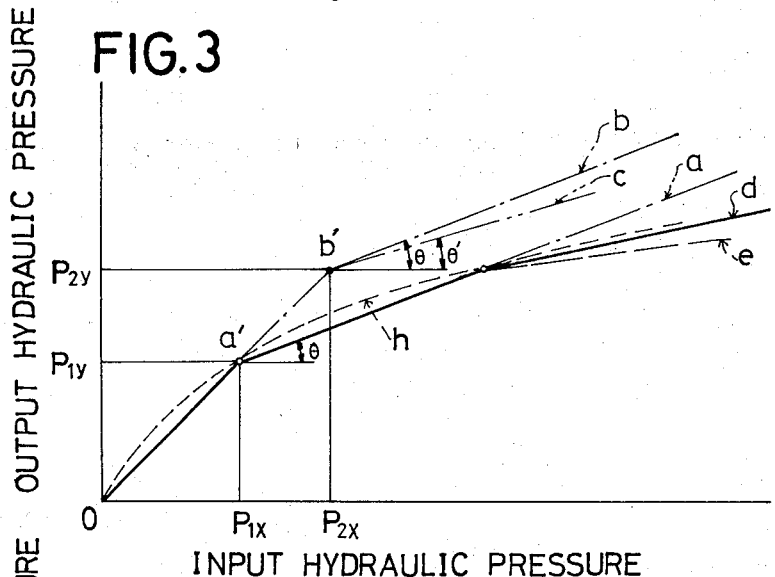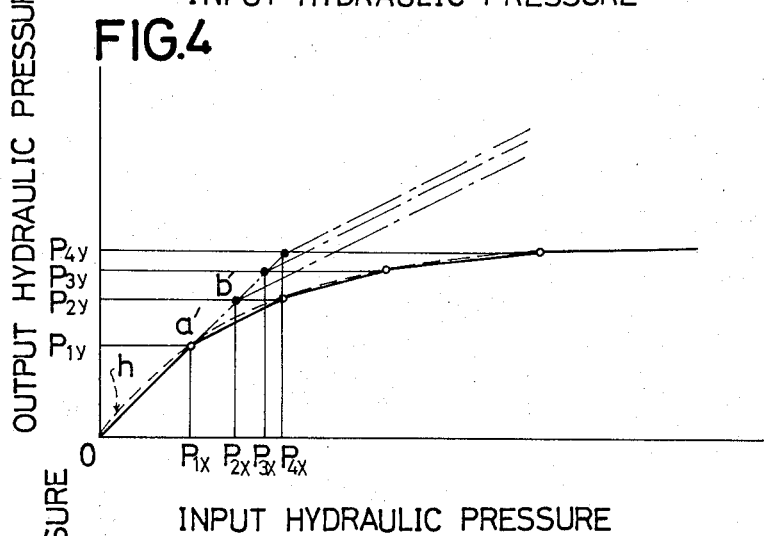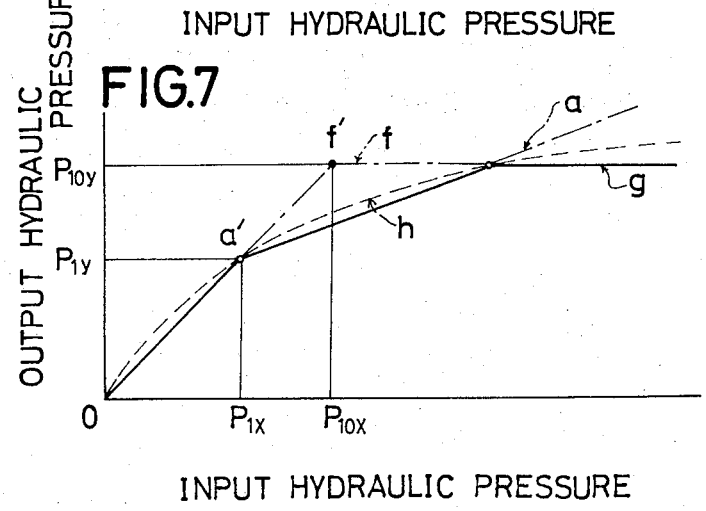

INVENTORS
AKIYOSHI HIRAI
HIROSHI KAWAGUCHI

BY Torun and McGrady
ATTORNEYS

HYDRAULIC BRAKE SYSTEM

BACKGROUND OF THE INVENTION

The present invention relates to hydraulic brake systems for vehicles such as automobiles and the like and, in particular, to a hydraulic brake system in which wheel skidding or zigzag movement of the rear end of the vehicle at the time of hard braking and is prevented by decreasing the braking force applied to the rear wheels in relationship to the braking force applied to the front wheels after a certain level of the brake force has been applied.

Generally, when a vehicle such as an automobile is braked hard, that is a heavy or strong pressure is applied to the brake pedal, the weight of the vehicle is shifted forward, and, as a result, the weight applied to the rear wheels is reduced. Consequently, the rear wheels become locked before the front wheels do, thus developing skidding or a zigzag movement of the rear end of the vehicle.

To prevent such a phenomenon, several methods have been proposed. In one of these methods the braking force applied to the rear wheels is decreased with respect to the braking force applied to the front wheels by reducing the rate of increase of the hydraulic braking pressure to the rear wheels along the ideal accordance in ccordance with the rate of increase of the hydraulic braking pressure to the front wheels. To afford the desired anti-skid operation, a proportioning valve or limiting valve is located in the hydraulic braking pressure circuit between the master cylinder directly linked to the break pedal and the brakes for the rear wheels. Thus, at first the hydraulic braking pressure to the rear wheels is distributed at an equal ratio with respect to the hydraulic braking pressure to the front wheels, and then they are applied with a hydraulic pressure of a lower increasing rate relative to the front wheels, or maintained at a constant hydraulic pressure. Compared with the method in which the braking pressure is distributed equally to both the front and rear wheel, the above-mentioned method of using a single proportioning or limiting valve leaves much to be desired, although it shows some advantage in achieving anti-skid operation inasmuch as the distribution of the hydraulic braking pressure slightly approachs the ideal distribution curve. Thus, this method can result in less effective braking because of excessive reduction of the hydraulic braking pressure to the rear wheels with respect to the hydraulic braking pressure supplied to the front wheels or it can cause frequent wheel slippage due to excessive increase in the pressure applied. Consequently, this method is technically imperfect.

SUMMARY OF THE INVENTION

The object of this invention is to prevent, as completely as is possible, wheel skidding or zigzag movement of the rear end of a vehicle when hard braking occurs by distributing the hydraulic braking pressure to the front and rear wheels as close as possible to the ideal curve.

In accordance with the present invention at least two pressure regulating valves, each having a different or equal starting point at which the output hydraulic pressure is provided at a lower rate of increase as compared to the rate of increase of the input hydraulic pressure, are arranged in series in a hydraulic pressure circuit connecting the master cylinder to the wheel cylinders of the rear wheels. Thus, the increasing rate of the hydraulic braking pressure applied to the wheel cylinders of the rear wheel is gradually reduced along the ideal curve by the pressure regulating action of the pressure regulating valves.

These and other features of the invention are pointed out in the claims. Other objects and advantages of the invention will become obvious from the following detailed description when read in the light of the accompanying drawings.

BREIF DESCRIPTION OF THE DRAWINGS

FIG. 3 is a chart showing the performance of the two pressure regulating or proportioning valves illustrated in FIG. 1 and the characteristics of the hydraulic brake system in accordance with the present invention;

FIG. 4 is a chart showing the characteristics of the hydraulic brake system according to this invention in which a plurality of pressure regulating or proportioning valves are employed;

FIG. 7 is a chart showing the performance of the pressure regulating or limiting valves illustrated in FIG. 6 and the characteristics of the hydraulic brake system in accordance with the present invention.

DESCRIPTION OF THE PREFERRED EMBODIMENTS

Figure 1:
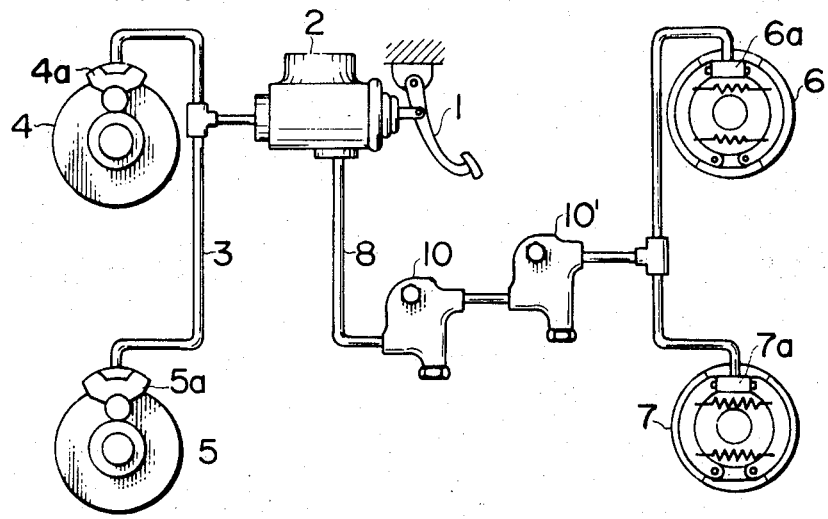
FIG. 1 is a piping diagram of an embodiment of a hydraulic brake system in accordance with the present invention.

In the embodiment of the invention illustrated in FIG. 1, a hydraulic brake system is shown in which a master cylinder 2 directly coupled to a brake pedal 1, is connected through a circuit 3 to cylinders 4a and 5a of front wheel disc brakes 4 and 5, respectively, and is also connected through a circuit 8 to wheel cylinders 6a and 7s of the rear wheel drum brakes 6 and 7, respectively. Pressure regulating or proportioning valves 10 and 10' each having different or equal pressure regulating performance characteristics are provided in series in the circuit 8. Thus, a hydraulic braking pressure developed in the master cylinder 2 by applying force to the brake pedal 1 is directly applied through the circuit 3 to the wheel cylinders 4a,5a of disc brakes 4 and 5. At the same time, the hydraulic braking pressure, regulated by the two pressure regulating valves 10 and 10', is applied through the circuit 8 to the wheel cylinders 6a, 7a of the rear wheel drum brakes 6 and 7.

Figure 2:
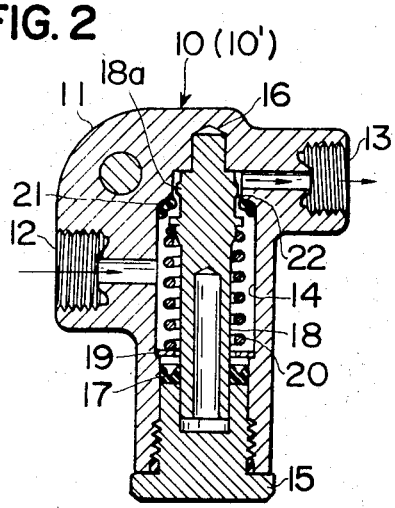
FIG. 2 is an enlarged cross-sectional view of a pressure regulating or proportioning valve employed in the hydraulic brake system of FIG. 1.

Referring now to FIG. 2, the pressure regulating valves 10 and 10' in the above-described system are proportioning valves and each comprises a body 11, an inlet 12 adapted to be connected to the master cylinder 2, and an outlet 13 adapted to be connected to the wheel cylinders 6a, 7a of the rear wheel drum brakes 6 and 7. The body 11 forms an axially elongated oil chamber 14 closed at one end and open at the other which provides communication between the inlet 12 and the outlet 13. An end plug 15 is screwed in a liquid tight manner into the open end of the oil chamber 14. At the closed end of the oil chamber 14, adjacent the outlet, a chamber 16 of reduced diameter compared to the oil chamber, is defined and one end of a plunger 18 is slidably inserted into this chamber. The other end of the plunger 18 is closely inserted with the aid of a seal 17 into the end plug 15 at the opposite end of the oil chamber 14. A coil spring 20 encircles the plunger and extends between a shoulder on the plunger and snap rings 19 secured within the oil chamber 14. Adjacent the outlet 13, a valve portion 22 is defined between an annular seal lip 21 secured to the surface of the oil chamber 14 and an annular shoulder portion 18a on the plunger for varying the hydraulic pressure between the inlet 12 and the outlet 13. Thus, the coil spring 20 biases the plunger 18 to maintain the valve portion 22 open and the input hydraulic pressure admitted through the inlet 12 also acts on the plunger 18 within the oil chamber 14 in the same manner as the spring 20, to maintain the valve portion 22 open. The output hydraulic pressure at the outlet 13 acts on the plunger 18 from the chamber 16 so as to close the valve portion 22. The valve portion 22 is kept fully opened until the input hydraulic pressure reaches a certain value determined by the preset load of the coil spring 20, depending on the relation between the valve opening force and the valve closing force, thus keeping the input hydraulic pressure at the inlet 12 and the output hydraulic pressure at the outlet 13 equal. When the input hydraulic pressure exceeds the certain value, the plunger 18 is moved by the output hydraulic pressure obtained at that time and the valve portion 22 is closed, thus interrupting the increase in the output hydraulic pressure. The input hydraulic pressure increases when the valve portion 22 is closed and, as a result, the valve portion 22 is again opened and the output hydraulic pressure is increased. In this manner the valve portion 22 repeats the opening and closing steps several times, thereby reducing the rate of increase of the output hydraulic pressure with respect to the rate of increase of input hydraulic pressure. The reduction in the output hydraulic pressure at this time is determined by the effective diameter of the valve portion 22 and the outer diameter of the plunger within the oil chamber 14.

As described above, the pressure regulating valves 10 and 10' employed in the hydraulic brake system according to this invention, effect a reduction in the rate of increase of the output hydraulic pressure after the starting point for pressure regulation is attained prior to which point the output hydraulic pressure is equal to the input hydraulic pressure. The pressure regulating performance characteristics of the pressure regulating valve 10 is different from that of the other valve 10', that is, their performance varies with the preset load of the coil spring 20, the effective diameter of the valve portion 22 and the outer diameter of the plunger within the oil chamber 14. Namely, the pressure regulating valve 10 closer to the break master cylinder 22 has its pressure regulation starting point $a'$ in the comparatively lower range of the input hydraulic pressure, as shown in the curve $a$ in FIG. 3. Thus, the output hydraulic pressure is decreased with an angle of inclination $\theta$ at the ratio $\alpha$ ($= \tan \theta$) from the point $a'$. As shown by the curve $b$ in the FIG. 3, the second pressure regulating valve 10' has its pressure regulation starting point $b'$ in the higher range of the input hydraulic pressure, thus decreasing the output hydraulic pressure with the angle of inclination $\theta$ and at the ratio $\alpha$ ($= \tan \theta$) from the point $b'$ in the same manner as curve $a$, or decreasing it with the angle of inclination $\theta'$ ($\theta' \neq \theta$, but $\theta' > < \theta$) at the ratio $\alpha'$ ($= \tan \theta'$) as shown by the curve $c$.

On the other hand, the pressure regulating performance characteristics of the valve 10 may be equal to that of the other valve 10'. That is, the pressure regulation starting points $a'$ of the valve 10 may be equal to or lower or higher than the pressure regulation starting points $b'$ of the valve 10'.

The operation of the above-described brake system is shown in the characteristic diagram of FIG. 3. If the hydraulic braking pressure developed in the master cylinder 2 under hard braking conditions and applied to the rear drum brakes 6 and 7 is lower than the value at the point $a'$ determined by the first regulating valve 10, the first and second pressure regulating valves or and 10' maintain the ourput hydraulic pressure equal to the input hydraulic pressure. Therefore, the pressure increases up to the point $a'$ along the characteristic curves $a$ and $b'$ of the first and second pressure regulating valves 10 and 10'. Then, when the hydraulic braking pressure of the brake master cylinder 2, that is, the pressure applied to the front wheel disc brakes 4 and 5, exceeds the point $a'$ of the first pressure regulating valve 10 and the output pressure of the first valve 10 of the input pressure of the second pressure regulating 10' does not exceed the point $b'$ of the second valve 10', the second regulating valve 10' continues to maintain its input hydraulic pressure equal to its output hydraulic pressure. Thus, the pressure is regulated by the first regulating valve 10 only without receiving any regulating action from the second regulating valve 10', and is increased at the reduced increasing rate along the characteristic curve $a$ of the first regulating valve 10. When the hydraulic braking pressure of the master cylinder 2 is further increased and the output pressure of the first valve 10 or the input pressure of the second valve 10' exceed the point $b'$ of the second pressure regulating valve 10'x the pressure is regulated by both regulating valves 10 and 10' and increases at the reducing ratio obtained by multiplying both reducing ratios of the two valves. This multiplied reducing ratio will be $\beta [ = \alpha^2 ]$ as shown by the curve $d$ if the pressure reducing ratio of the regulated pressure in the second pressure regulating valve 10' is equal to that in the first pressure regulating valve 10. The multiplied reducing ratio will be $\beta^1$ [$=\alpha \times \alpha^1$] as shown by the curve $e$ if the reducing ratio of the regulated pressure in the second regulating valve is which is different from that of the first regulator valve.

In addition to this embodiment, if three, four or more pressure regulating valves each having at least one pressure regulating starting point are arranged in series in the circuit 8, the above-described pressure regulating operation is repeated many times, resulting in smoother characteristic curves as shown in FIG. 4. At the same time, the hydraulic braking pressure applied to the rear wheel drum brakes 6 and 7 is distributed under conditions which are very close to the ideal characteristic curve $h$. In the second embodiment of this invention the pressure regulating valves consist of a proportioning valve and a limiting valve which is shown in FIGS. 5 through 7.

Figure 5:
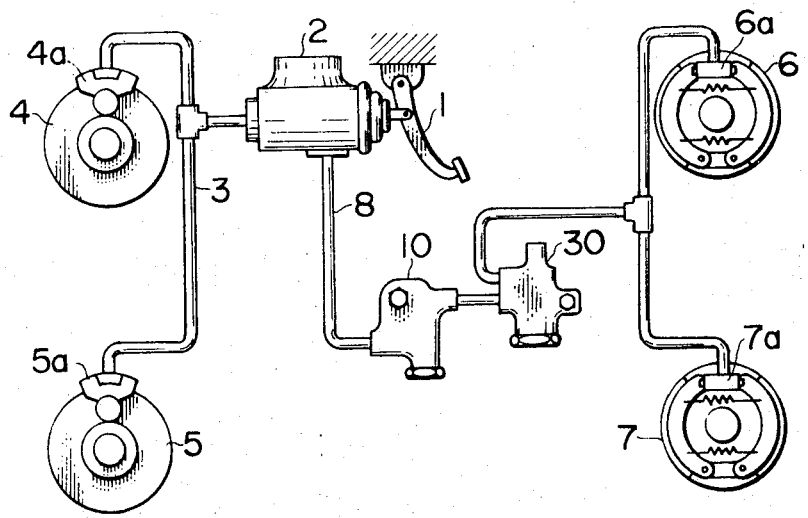
FIG. 5 is a piping diagram of another embodiment of the hydraulic brake system according to the present invention.

As illustrated in FIG. 5, a pressure regulating valve 10 which is a proportioning valve 10 and another pressure regulating valve 30 which is a limiting valve are arranged in series in a circuit 8 extending between the master cylinder 2 and the wheel cylinders 6a and 7a for the rear wheel drum brakes 6 and 7, in the same manner as in the first embodiment.

Figure 6:
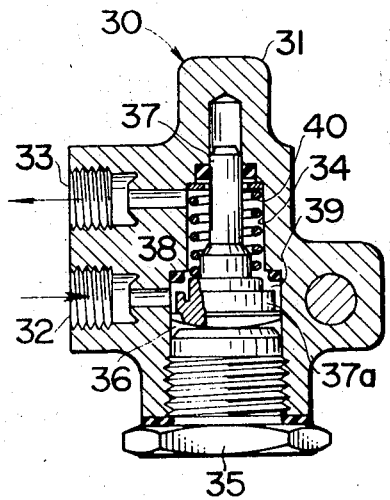
FIG. 6 is an enlarged cross-sectional view of an example of another type of pressure regulating or limiting valve as used in the system of FIG. 5.

In FIG. 6, the pressure regulating valve 30 is illustrated and consists of a valve body forming an oil chamber open open at one end and with an inlet 32 and an outlet 33 communicating with the oil chamber. Furthermore, the open end of the oil chamber 34 is closed by an end plug 35. The portion of the oil chamber 34 into which the inlet 32 opens is larger in diameter than the portion to which the outlet 33 is connected and it defines a chamber 36 adjacent the end plug 35. A plunger 37 is fitted into the oil chamber 34. A valve portion 39 is formed between an annular shoulder portion 37a on the plunger 37 within the chamber 36 and a seal 38 on the juxtaposed wall of the chamber 36. Moreover, the plunger 37 is biased by a coil spring 40 for keeping the valve portion 39 open. Thus, while the coil spring 40 functions to open the valve portion 39 with its own force, the inlet hydraulic pressure admitted through the inlet 32 acts on the plunger 37 to close the valve portion 39. The valve portion 39 is kept fully opened until the input hydraulic pressure becomes equal to a certain value determined by the preset load of the coil spring 40, depending on the relation between the valve opening force and the valve closing force, thus maintaining the output hydraulic pressure at the outlet 33 equal to the input hydraulic pressure. When the inlet pressure exceeds the certain value, the plunger 37 is moved by the input pressure and the valve portion 39 is closed, thereby interrupting the increase in the output hydraulic pressure and maintaining the output hydraulic pressure at the certain constant value. Thus, in the valves of the second embodiment, the pressure regulating valve 10 has a characteristic curve similar to that of the first pressure regulating valve 10 in the first embodiment, as shown by the curve $a$ in FIGS. 3 and 7. The other pressure regulating or limiting valve 30 has the pressure limiting starting point $f'$ in the range of higher input hydraulic pressure due to the preset load of the coil spring 40, as shown by $f$ in FIG. 7. When the input hydraulic pressure at the time of the application of the hydraulic braking pressure to the rear wheel drum brakes 6 and 7 exceeds the value at the point $f'$ determined by the pressure regulating valve 30, a constant hydraulic braking pressure which is cut regardless of the pressure regulating action of another pressure regulating valve 10 is maintained as shown by $f$ in FIG. 7, thus obtaining a constant braking force.

As described above, with reference to the preferred embodiments, the hydraulic brake system according to this invention provides the distribution of the hydraulic braking pressure to the front and rear wheels under the condition which is very close to the ideal curve $h$. Thus, the system of this invention is quite advantageous in ensuring that anti-skid operation is most effective at the time of hard braking. Furthermore, the system according to this invention is simple in construction and expects efficient performance by operation directly on the hydraulic braking pressure.

The pressure regulating valves used in the brake system of this invention are not limited to the aforementioned proportioning or limiting valves illustrated in FIGS. 2 and 6, but valves of any other construction may be utilized if they have the same performance.

The first and second pressure regulating valves may be integrally constructed in appearance. Any changes and modifications in design can be made as long as their arrangement does not depart from the spirit and scope of this invention.

While specific embodiments of the invention have been shown and described in detail to illustrate the application of the inventive principles, it will be understood that the invention may be embodied otherwise without departing from such principles.

What is claimed is:

1. A hydraulic brake system for motor vehicles including a master cylinder, a pair of front wheels, a pair of rear wheels, a separate cylinder associated with each of said front wheels, a separate cylinder associated with each of said rear wheels, a first circuit communicating between said master cylinder and said cylinders on said front wheels, a second circuit communicating between said master cylinder and said cylinders on said rear wheels, wherein the improvement comprises at least two pressure regulating valves arranged in series in said second circuit, at least one of said valves arranged to provide an output hydraulic pressure of a lesser rate as compared to the input hydraulic pressure of increasing rate supplied to said valve after the increasing hydraulic pressure has reached a predetermined value so that the rate of output hydraulic pressure supplied to said cylinders of said rear wheels can be maintained below the increasing rate of input hydraulic pressure, whereby the pressure in said cylinders on said rear wheels approaches the ideal pressure-decreasing characteristic curve so as to prevent said rear wheels from locking.

2. A hydraulic brake system, as set forth in claim 1, wherein said regulating valves are proportioning valves and each provides the output hydraulic pressure at a lower increasing rate than the input after a regulation starting point.

3. A hydraulic brake system, as set forth in claim 2, wherein an increasing rate of the regulated output pressure in one said pressure regulating valve differs from that in the other pressure regulating valve.

4. A hydraulic brake system, as set forth in claim 2, wherein an increasing rate of the regulated output pressure in one said pressure regulating valve is equal to that in the other pressure regulating valve.

5. A hydraulic brake system, as set forth in claim 2, wherein the regulation starting points of said valve differ from each other.

6. A hydraulic brake system, as set forth in claim 2, wherein a regulation starting point of one said pressure regulating valve is equal to that of the other regulating valve.

7. A hydraulic brake system, as set forth in claim 1, wherein at least one said pressure regulating valve located most downstream is a limiting vlave and provides the output hydraulic pressure at a constant level as compared to the increasing level of the input hydraulic pressure after the predetermined value for said valve has been reached.

8. A hydraulic brake system as set forth in claim 1 wherein said at least one valve comprises means defining a valve chamber having an inlet and an outlet, a plunger axially movable in said chamber, an annular seal means in said chamber between said inlet and outlet and an annular shoulder on said plunger arranged to cooperate with said seal means for forming a valve portion thereon, said plunger being displaced to close said valve portion when the inlet hydraulic pressure exceeds a predetermined value.

9. A hydraulic brake system for motor vehicles including a master cylinder, a pair of front wheels, a pair of rear wheels, a separate cylinder associated with each of said front wheels, a separate cylinder associated with each of said rear wheels, a first circuit communicating between said master cylinder and said cylinders on said front wheels, a second circuit communicating between said master cylinder and said cylinders on said rear wheels, at least two pressure regulating valves arranged in series in said second circuit, said regulating valves being in the form of proportioning valves and each providing an output hydraulic pressure at a lower increasing rate than the input after a regulation starting point, said pressure regulating valve comprising a valve body having an axially elongated chamber therein extending between an end closed by said valve body and an open end, an end plug forming a closure for the open end of said chamber, said valve body having an inlet therethrough to said chamber located intermediate the ends of said chamber, said valve body having an outlet therethrough from said chamber positioned between said inlet and the closed end of said chamber, the closed end of said chamber having an axially extending section of reduced diameter, a plunger positioned within and axially movable through said chamber and one end of said plunger slidably fitted within the section of reduced diameter of said chamber, a seal positioned adjacent to the open end of said chamber and closely fitting about said plunger, spaced spring support means located within said chamber, a spring positioned between said spring support means for biasing said plunger toward the closed end of said chamber, an annular seal lip positioned about the surface of said chamber and located between said inlet and outlet, an annular shoulder portion formed on and extending outwardly from said plunger adjacent to the closed end of said chamber and arranged to cooperate with said seal lip for forming a valve portion therein so that said spring biases said plunger for maintaining the valve portion open and when the input hydraulic pressure exceeds a predetermined value, said plunger is displaced for closing the valve portion, each said valve providing an output hydraulic pressure of a lesser rate as compared to the input hydraulic pressure of increasing rate supplied to said valve after the increasing hydraulic pressure has reached a predetermined value so that the rate of output hydraulic pressure supplied to said cylinders of said rear wheels can be maintained below the increasing rate of input hydraulic pressure.

10. A hydraulic brake system for motor vehicles including a master cylinder, a pair of front wheels, a pair of rear wheels, a separate cylinder associated with each of said front wheels, a separate cylinder associated with each of said rear wheels, a first circuit communicating between said master cylinder and said cylinders on said front wheels, a second circuit communicating between said master cylinder and said cylinders on said rear wheels, at least two pressure regulating valves arranged in series in said second circuit, at least one of said valves providing an output hydraulic pressure of a lesser rate as compared to the input hydraulic pressure of increasing rate supplied to said valve after the increasing hydraulic pressure has reached a predetermined value so that the rate of output hydraulic pressure supplied to said cylinders of said rear wheels can be maintained below the increasing rate of input hydraulic pressure, said at least one pressure regulating valve comprising a valve body forming an axially elongated chamber therein extending between an end closed by said valve body and an open end, an end plug forming a closure for the open end of said chamber, said valve body having an inlet therethrough to said chamber located intermediate the ends of said chamber, said valve body having an outlet therethrough from said chamber positioned between said inlet and the closed end of said chamber, the closed end of said chamber having an axially extending section of reduced diameter, a plunger positioned within and axially movable through said chamber and one end of said plunger slidably fitted within the section of reduced diameter of said chamber, a seal positioned adjacent to the closed end of said chamber and closely fitting about said plunger, spaced spring support means located within said chamber, a spring positioned between said spring support means for biasing said plunger toward the open end of the chamber, an annular seal positioned about the surface of said chamber and located between said inlet and outlet, an annular shoulder portion formed on and extending outwardly from said plunger adjacent the open end of said chamber and arranged to cooperate with said annular seal for forming a valve portion therein so that said spring biases said plunger for maintaining the valve portion open and when the input hydraulic pressure exceeds a predetermined value, said plunger is displaced for closing the valve portion, at least one of said pressure regulating valve located most downstream being a limiting valve and providing an output hydraulic pressure at a constant level as compared to the increasing level of the input hydraulic pressure after the predetermined value for said valve has been reached.

* * * * *